(12) United States Patent
Hirokawa

(10) Patent No.: US 12,087,085 B2
(45) Date of Patent: Sep. 10, 2024

(54) INFORMATION PROCESSING DEVICE, INFORMATION PROCESSING METHOD, AND STORAGE MEDIUM

(71) Applicant: NEC Corporation, Tokyo (JP)

(72) Inventor: Akira Hirokawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/265,289

(22) PCT Filed: Nov. 18, 2021

(86) PCT No.: PCT/JP2021/042441
§ 371 (c)(1),
(2) Date: Jun. 5, 2023

(87) PCT Pub. No.: WO2022/130891
PCT Pub. Date: Jun. 23, 2022

(65) Prior Publication Data
US 2024/0037983 A1 Feb. 1, 2024

(30) Foreign Application Priority Data

Dec. 14, 2020 (JP) .................................. 2020-206529

(51) Int. Cl.
*G06V 40/12* (2022.01)

(52) U.S. Cl.
CPC ...... *G06V 40/1347* (2022.01); *G06V 40/1365* (2022.01)

(58) Field of Classification Search
CPC ........... G06V 40/1347; G06V 40/1365; G06V 40/1376; G06V 40/1359; G06T 7/00
See application file for complete search history.

(56) References Cited

U.S. PATENT DOCUMENTS

| 5,650,842 A * | 7/1997 | Maase ................ G06V 40/1324 |
| | | 382/125 |
| 2006/0002595 A1 | 1/2006 | Hara et al. |
| 2006/0153432 A1* | 7/2006 | Lo ...................... G06V 40/1365 |
| | | 283/68 |

(Continued)

FOREIGN PATENT DOCUMENTS

| JP | 2002-298127 A | 10/2002 |
| JP | 2006-018731 A | 1/2006 |

(Continued)

OTHER PUBLICATIONS

International Search Report for PCT Application No. PCT/JP2021/042441, mailed on Feb. 8, 2022.

*Primary Examiner* — Antonio Xavier
(74) *Attorney, Agent, or Firm* — Sughrue Mion, PLLC.

(57) ABSTRACT

An information processing device includes: an acquisition unit that acquires a rolled print and a slap print on the same finger; an extraction unit that extracts first feature points from the rolled print and second feature points from the slap print, respectively; and an estimation unit that, based on a ratio occupied by the first feature points having no correspondence with the second feature points out of the first feature points included in a common region that is common to the rolled print and the slap print, estimates a first work amount of correction work performed by a user on a non-common region excluding the common region from the rolled print.

10 Claims, 16 Drawing Sheets

(56) References Cited

U.S. PATENT DOCUMENTS

| | | | |
|---|---|---|---|
| 2013/0176604 A1 | 7/2013 | Yamamoto | |
| 2014/0044324 A1 | 2/2014 | Hara et al. | |
| 2020/0074198 A1* | 3/2020 | Oh | G06F 21/32 |
| 2021/0319204 A1* | 10/2021 | Zheng | G06V 10/757 |

FOREIGN PATENT DOCUMENTS

| | | |
|---|---|---|
| JP | 2007-048116 A | 2/2007 |
| JP | 2012-073704 A | 4/2012 |
| JP | 2019-020772 A | 2/2019 |
| JP | 2019-045924 A | 3/2019 |
| JP | 2019-191913 A | 10/2019 |
| JP | 2019-207702 A | 12/2019 |

\* cited by examiner

FIG. 8A

| | Card ID | Estimated work amount (0 to 100) | Estimated work time (h) | Actual work time (h) | DB registration status | Registrant ID |
|---|---|---|---|---|---|---|
| ■ | 100205 | 45 | T1 | T10 | Registered | user101 |
| ☑ | 100206 | 52 | T2 | - | Unregistered | - |
| ■ | 100207 | 60 | T3 | T11 | Registered | user102 |
| ■ | 100208 | 65 | T4 | T12 | Registered | user103 |
| ☐ | 100209 | 43 | T5 | - | Unregistered | - |
| ☐ | 100213 | 55 | T6 | - | Unregistered | - |
| ■ | 100215 | 72 | T7 | T13 | Registered | user101 |
| ☐ | 100220 | 90 | T8 | - | Unregistered | - |
| ☐ | 100221 | 85 | T9 | - | Unregistered | - |

Search result display window

[Search criteria]

- Creation date of ten-print card : November 01, 2020 to November 30, 2020
- Estimated work amount : 40 or greater
- DB registration status : Unspecified

[Search result]

Enter  Back  End

FIG. 8B

| | Search result display window | | | | |
|---|---|---|---|---|---|
| \[Search criteria\] | | | | | |
| • Creation date of ten-print card : November 01, 2020 to November 30, 2020 | | | | | |
| • Estimated work amount : 40 or greater | | | | | |
| • DB registration status : Unspecified | | | | | |

\[Search result\]

| | Card ID | Estimated work amount (0 to 100) | DB registration status | Registrant ID | ... |
|---|---|---|---|---|---|
| ■ | 100205 | 45 | Registered | user101 | ... |
| ☑ | 100206 | 52 | Unregistered | - | ... |
| ■ | 100207 | 60 | Registered | user102 | ... |
| ■ | 100208 | 65 | Registered | user103 | ... |
| ☐ | 100209 | 43 | Unregistered | - | ... |
| ☐ | 100213 | 55 | Unregistered | - | ... |
| ■ | 100215 | 72 | Registered | user101 | ... |
| ☐ | 100220 | 90 | Unregistered | - | ... |
| ☐ | 100221 | 85 | Unregistered | - | ... |

Enter  Back  End

FIG. 8C

| | Card ID | Estimated work time (h) | DB registration status | Registrant ID | ... |
|---|---|---|---|---|---|
| ■ | 100205 | T1 | Registered | user101 | ... |
| ☑ | 100206 | T2 | Unregistered | - | ... |
| ■ | 100207 | T3 | Registered | user102 | ... |
| ■ | 100208 | T4 | Registered | user103 | ... |
| ☐ | 100209 | T5 | Unregistered | - | ... |
| ☐ | 100213 | T6 | Unregistered | - | ... |
| ■ | 100215 | T7 | Registered | user101 | ... |
| ☐ | 100220 | T8 | Unregistered | - | ... |
| ☐ | 100221 | T9 | Unregistered | - | ... |

Search result display window

[Search criteria]
- Creation date of len-print card : November 01, 2020 to November 30, 2020
- Estimated work time : XX hours or longer
- DB registration status : Unspecified

[Search result]

Enter   Back   End

FIG. 8D

| | Search result display window | | | | | |
|---|---|---|---|---|---|---|
| [Search criteria] | | | | | | |
| · Creation date of ten-print card | : November 01, 2020 to November 30, 2020 | | | | | |
| · Estimated work amount | : 40 or greater | | | | | |
| · DB registration status | : Unspecified | | | | | |

[Search result]

| | Card ID | Estimated work amount (0 to 100) | Estimated work time (h) | DB registration status | Registrant ID | ... |
|---|---|---|---|---|---|---|
| ■ | 100205 | 45 | T1 | Registered | user101 | ... |
| ☑ | 100206 | 52 | T2 | Unregistered | - | ... |
| ■ | 100207 | 60 | T3 | Registered | user102 | ... |
| ■ | 100208 | 65 | T4 | Registered | user103 | ... |
| ☐ | 100209 | 43 | T5 | Unregistered | - | ... |
| ☐ | 100213 | 55 | T6 | Unregistered | - | ... |
| ■ | 100215 | 72 | T7 | Registered | user101 | ... |
| ☐ | 100220 | 90 | T8 | Unregistered | - | ... |
| ☐ | 100221 | 85 | T9 | Unregistered | - | ... |

[ Enter ]  [ Back ]  [ End ]

FIG. 9

| Card ID | Estimated work information |
|---|---|
| 100205 | ********************* |
| 100206 | ********************* |
| 100207 | ********************* |
| 100208 | ********************* |
| 100209 | ********************* |
| 100213 | ********************* |
| 100215 | ********************* |
| 100220 | ********************* |
| 100221 | ********************* |

Estimated work information list window

Back  End

FIG. 10

| Card ID | Left hand | | | | | Right hand | | | | |
|---|---|---|---|---|---|---|---|---|---|---|
| | Little finger | Ring finger | Middle finger | Index finger | Thumb | Thumb | Index finger | Middle finger | Ring finger | Little finger |
| 100101 | 3 | 4 | 2 | 6 | 7 | 10 | 1 | 3 | 2 | 4 |
| 100102 | 1 | 1 | 1 | 2 | 3 | 5 | 3 | 2 | 1 | 1 |
| 100103 | 2 | 1 | 2 | 1 | 3 | 2 | 3 | 2 | 2 | 1 |
| 100104 | 6 | 4 | 5 | 6 | 2 | 3 | 4 | 5 | 3 | 4 |
| 100105 | 4 | 5 | 5 | 5 | 5 | 6 | 4 | 5 | 4 | 5 |
| 100106 | 1 | 1 | 1 | 1 | 2 | 3 | 2 | 1 | 1 | 1 |
| 100107 | 2 | 7 | 7 | 10 | 7 | 8 | 7 | 7 | 9 | 8 |
| 100108 | 9 | 8 | 8 | 8 | 8 | 8 | 9 | 7 | 6 | 8 |
| 100109 | 8 | 2 | 6 | 7 | 8 | 9 | 10 | 2 | 9 | 5 |
| 100110 | 3 | 1 | 1 | 2 | 3 | 5 | 3 | 2 | 1 | 1 |
| 100111 | 1 | 4 | 1 | 2 | 6 | 2 | 6 | 2 | 3 | 1 |
| 100112 | 5 | 1 | 1 | 2 | 3 | 5 | 3 | 3 | 1 | 2 |
| 100113 | 1 | 6 | 4 | 3 | 2 | 2 | 4 | 5 | 1 | 1 |

Estimated work amount list window

Back  End

INFORMATION PROCESSING DEVICE, INFORMATION PROCESSING METHOD, AND STORAGE MEDIUM

This application is a National Stage Entry of PCT/JP2021/042441 filed on Nov. 18, 2021, which claims priority from Japanese Patent Application 2020-206529 filed on Dec. 14, 2020, the contents of all of which are incorporated herein by reference, in their entirety.

TECHNICAL FIELD

The disclosure relates to an information processing device, an information processing method, and a storage medium.

BACKGROUND ART

Patent Literature 1 discloses a fingerprint image processing device that matches a rolled print cut out from a ten-print card with a slap print and outputs a result of the matching. According to this device, since it is possible to correct an error in a fingerprinting position or an error in designation of a finger when registering a fingerprint image to a database, this can improve accuracy in fingerprint matching.

CITATION LIST

Patent Literature

PTL 1: Japanese Patent Application Laid-Open No. 2019-20772

SUMMARY OF INVENTION

Technical Problem

In some rolled prints and slap prints cut out from a ten-print card, a fingerprinted region may be unclear as a whole or a part of a fingerprinted region may be missing. In such a case, for example, based on a slap print that is in a relatively better fingerprint state, a user manually performs correction work such as deletion of a feature point, supplementing and shifting of a core line, or the like on a rolled print of the same finger.

However, the work amount in such correction work as described above varies significantly in accordance with the fingerprint state recorded in a ten-print card selected by the user. In particular, it is difficult to estimate a work amount on a region that is in a rolled print but is not common to a slap print.

Solution to Problem

According to one example aspect of the disclosure, provided is an information processing device including: an acquisition unit that acquires a rolled print and a slap print on the same finger; an extraction unit that extracts first feature points from the rolled print and second feature points from the slap print, respectively; and an estimation unit that, based on a ratio occupied by the first feature points having no correspondence with the second feature points out of the first feature points included in a common region that is common to the rolled print and the slap print, estimates a first work amount of correction work performed by a user on a non-common region excluding the common region from the rolled print.

According to another example aspect of the disclosure, provided is an information processing method including: acquiring a rolled print and a slap print on the same finger; extracting first feature points from the rolled print and second feature points from the slap print, respectively; and based on a ratio occupied by the first feature points having no correspondence with the second feature points out of the first feature points included in a common region that is common to the rolled print and the slap print, estimating a first work amount of correction work performed by a user on a non-common region excluding the common region from the rolled print.

According to another example aspect of the disclosure, provided is a storage medium storing a program that causes a computer to perform steps of: acquiring a rolled print and a slap print on the same finger; extracting first feature points from the rolled print and second feature points from the slap print, respectively; and based on a ratio occupied by the first feature points having no correspondence with the second feature points out of the first feature points included in a common region that is common to the rolled print and the slap print, estimating a first work amount of correction work performed by a user on a non-common region excluding the common region from the rolled print.

BRIEF DESCRIPTION OF DRAWINGS

FIG. 8A is a diagram illustrating an example of a search result display window according to the first example embodiment.

FIG. 8B is a diagram illustrating an example of the search result display window according to the first example embodiment.

FIG. 8C is a diagram illustrating an example of the search result display window according to the first example example embodiment.

FIG. 8D is a diagram illustrating an example of the search result display window according to the first example embodiment.

FIG. 9 is a diagram illustrating an example of an estimated work information list window according to a second example embodiment.

FIG. 10 is a diagram illustrating an example of an estimated work amount list window according to a third example embodiment.

DESCRIPTION OF EMBODIMENTS

Figure 1:
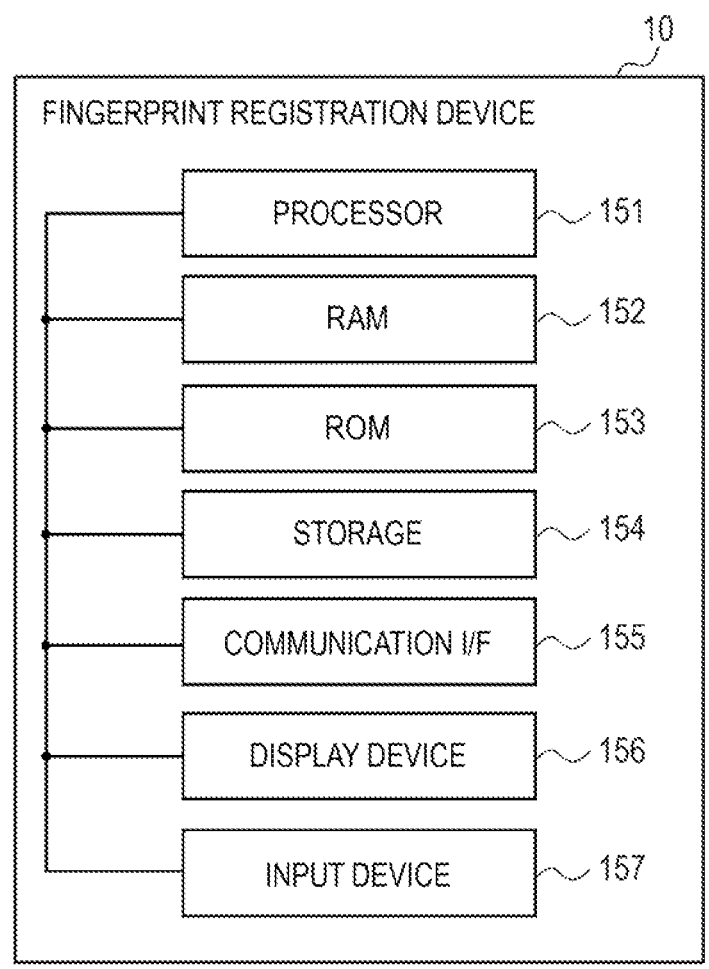
FIG. 1 is a block diagram illustrating a hardware configuration example of a fingerprint registration device according to a first example embodiment.

Exemplary example embodiments of the disclosure will be described below with reference to the drawings. In the drawings, similar elements or corresponding elements are labeled with the same reference, and the description thereof may be omitted or simplified.

First Example Embodiment

A fingerprint registration device 10 according to the present example embodiment will be described with reference to FIG. 1 to FIG. 8D. The fingerprint registration device 10 of the present example embodiment supports a user who performs registration and correction work on a fingerprint image from fingerprint images taken in advance for fingerprint matching as preprocessing for matching. By matching feature points with each other between a plurality of fingerprint images, it is possible to perform fingerprint matching to determine whether or not fingerprint images to be matched are those of the same person.

FIG. 1 is a block diagram illustrating a hardware configuration example of the fingerprint registration device 10. The fingerprint registration device 10 may be, for example, a computer such as a desktop personal computer (PC), a note PC, a tablet PC, or the like.

The fingerprint registration device 10 includes a processor 151, a random access memory (RAM) 152, a read only memory (ROM) 153, a storage 154, a communication interface (I/F) 155, a display device 156, and an input device 157 as a computer that performs calculation, control, and storage. These devices are connected to each other via a bus, a wiring, a drive device, or the like.

The processor 151 has a function of performing predetermined calculation in accordance with a program stored in the ROM 153, the storage 154, or the like and controlling respective units of the fingerprint registration device 10. Further, a central processing unit (CPU), a graphics processing unit (GPU), a field programmable gate array (FPGA), or the like may be used as the processor 151.

The RAM 152 is formed of a volatile storage medium and provides a temporary memory area required for operations of the processor 151. The ROM 153 is formed of a nonvolatile storage medium and stores necessary information such as a program used in operations of the fingerprint registration device 10.

The storage 154 is formed of a nonvolatile storage medium and stores a database, stores an operating program of the fingerprint registration device 10, or the like. The storage 154 is formed of a hard disk drive (HDD) or a solid state drive (SSD), for example.

The communication I/F 155 is a communication interface based on a specification such as Ethernet (registered trademark), Wi-Fi (registered trademark), 4G, or the like and is a module used for communicating with other devices.

The display device 156 is a liquid crystal display, an organic light emitting diode (OLED) display, or the like configured to display a moving image, a still image, a text, or the like and is used for presenting information to the user.

The input device 157 is a keyboard, a pointing device, a button, or the like and accepts a user operation. The display device 156 and the input device 157 may be integrally formed as a touch panel.

Note that the hardware configuration illustrated in FIG. 1 is an example, a device other than the above may be added, or some of the devices may not be provided. Further, some of the devices may be replaced with another device having a similar function. Further, some of the functions of the present example embodiment may be provided by another device via a network, or the functions of the present example embodiment may be distributed to and implemented by a plurality of devices. As discussed above, the hardware configuration illustrated in FIG. 1 may be changed as appropriate.

Figure 2:
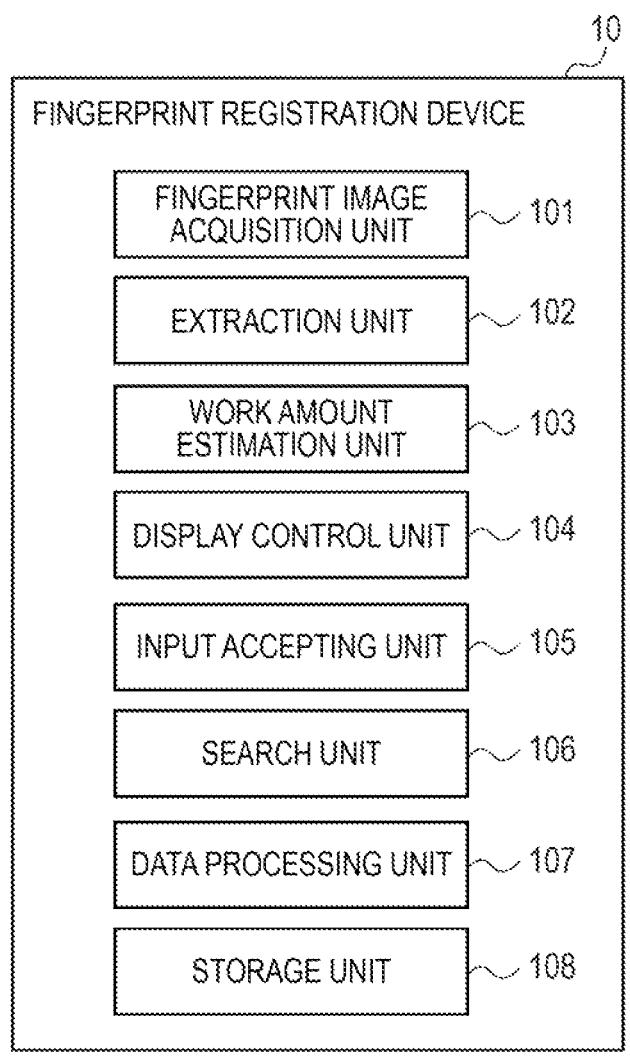
FIG. 2 is a function block diagram of the fingerprint registration device according to the first example embodiment.

FIG. 2 is a function block diagram of the fingerprint registration device 10 according to the present example embodiment. The fingerprint registration device 10 has a fingerprint image acquisition unit 101, an extraction unit 102, a work amount estimation unit 103, a display control unit 104, an input accepting unit 105, a search unit 106, a data processing unit 107, and a storage unit 108.

The processor 151 loads a program stored in the ROM 153, the storage 154, or the like into the RAM 152 and executes the program. Accordingly, the processor 151 implements functions of the fingerprint image acquisition unit 101, the extraction unit 102, the work amount estimation unit 103, the display control unit 104, the search unit 106, and the data processing unit 107. The process performed by these units will be described later. The processor 151 controls the input device 157 and thereby implements the function of the input accepting unit 105. The processor 151 controls the storage 154 and thereby implements the function of the storage unit 108.

Figure 3:
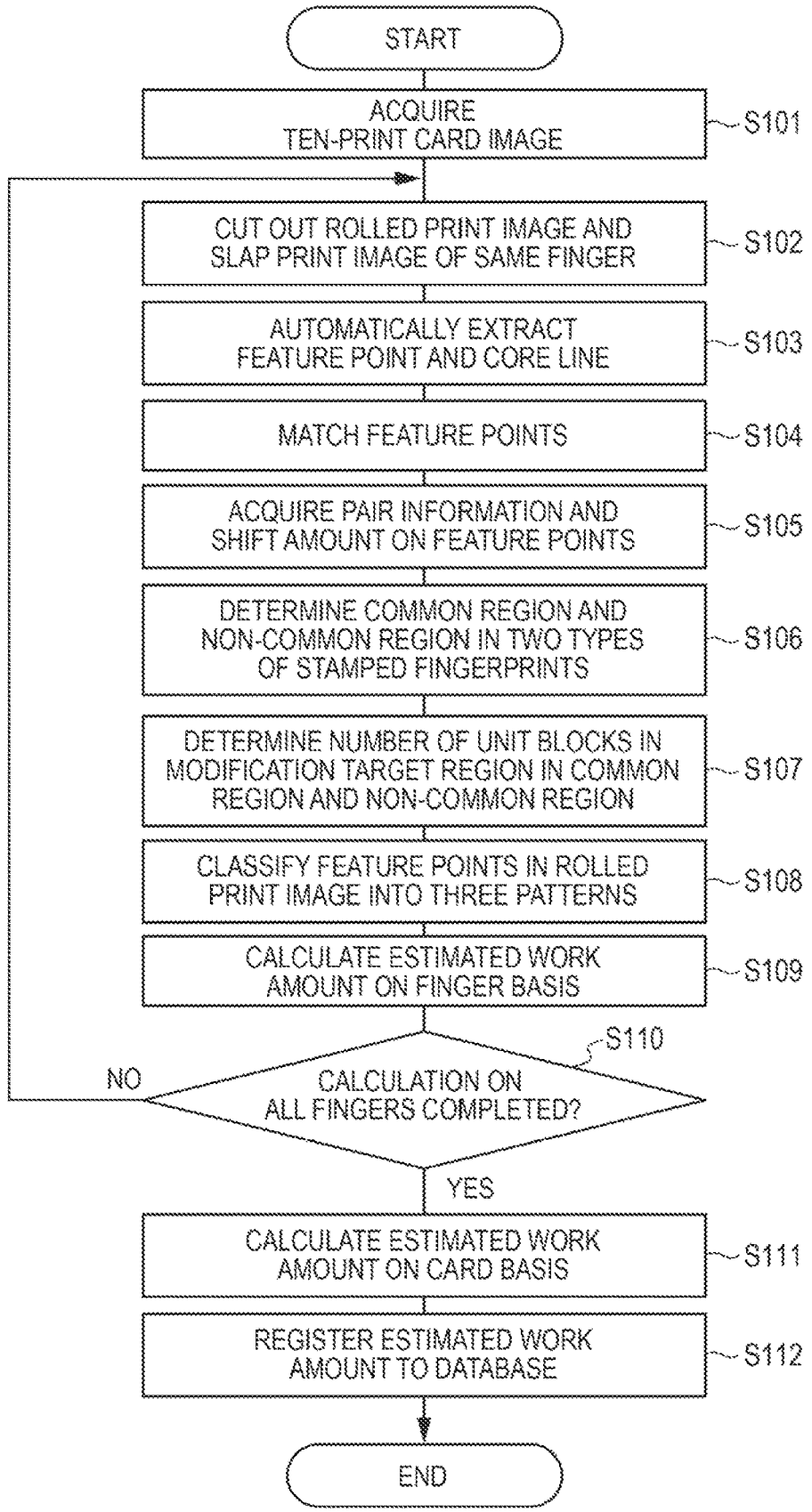
FIG. 3 is a flowchart illustrating an overview of an estimation process of a work amount performed in the fingerprint registration device according to the first example embodiment.

FIG. 3 is a flowchart illustrating the overview of an estimation process of a work amount performed in the fingerprint registration device 10 according to the present example embodiment. For example, this process is performed when a new ten-print card image is input to the fingerprint registration device 10.

In step S101, the fingerprint image acquisition unit 101 acquires a ten-print card image of a target registrant via the input device 157 or a network (not illustrated).

Figure 4:
FIG. 4 is a diagram illustrating an example of a ten-print card according to the first example embodiment.

FIG. 4 is a diagram illustrating an example of a ten-print card according to the present example embodiment. The 10 fingers refer to 10 fingers of both hands. Five fingers of one hand refer to a pollex, a forefinger, a middle finger, a fourth finger, and a little finger, respectively. A pollex, a forefinger, a middle finger, a fourth finger, and a little finger refer to a thumb, an index finger, a middle finger, a ring finger, and a little finger, respectively. The ten-print card includes 14 types of fingerprint images in total including 10 types of rolled prints and 4 types of slap prints. The fingerprint images in the dashed line part RP represent rolled prints. The fingerprint images in the dashed line part SP represent slap prints.

The fingerprint images illustrated in FIG. 4 may be images of patterns transferred on a sheet when one applies ink or the like to fingers and stamps these fingers on the sheet, for example. The fingerprint images are stored in a storage unit or the like in a digitized manner in a predetermined file format. For example, the digitized fingerprint images may be grayscale images. Note that fingerprint images may be images taken by an optical fingerprint reading device or may be images of fingerprints left on an object, and the method of taking the fingerprint images is not particularly limited.

Further, in the ten-print card of FIG. 4, 10 types of rolled print image frames and 4 types of slap print image frames are printed in advance. The rolled print image frames and the slap print image frames are used for extracting a fingerprinted region of each finger from the ten-print card.

In step S102, the fingerprint image acquisition unit 101 cuts a rolled print image and a slap print image for the same finger out of the rolled print images and the slap print images for 10 fingers recorded in the ten-print card image.

In step S103, the extraction unit 102 automatically extracts feature points and core lines from the rolled print image and the slap print image, respectively.

The extraction unit 102 extracts one or more core lines by recognizing black areas (portion with low intensity) of the fingerprint images as illustrated in FIG. 4 and generating image data that renders the core lines so as to follow the black areas. Each extracted core line may be, for example, a line with one-pixel width. There are various algorithms used for extraction of core lines performed by the extraction unit 102 without being limited to a single algorithm. The difference between these multiple algorithms may be, for example, a difference in parameters for image processing, such as smoothing, edge enhancement, noise removal, or the like, on a fingerprint image performed as preprocessing before extraction of core lines.

Further, another example of differences between multiple algorithms may be a difference in parameters of an extraction process, such as an extraction resolution, a threshold used for determination of a ridge, or the like. After extracting core lines from a fingerprint image, the extraction unit 102 then extracts feature points of each core line. There are two types of feature points that are a branch point at which a core line is branched and an end point of the core line. Note that, in the present example embodiment, the extraction unit 102 uses a single algorithm to extract feature points and core lines from the rolled print and the slap print.

In step S104, the extraction unit 102 matches feature points extracted respectively from the rolled print image and the slap print image with each other. In the following, in the present example embodiment, a feature point extracted from a rolled print is referred to as "first feature point", and a feature point extracted from a slap print is referred to as "second feature point", respectively.

Figure 5A:
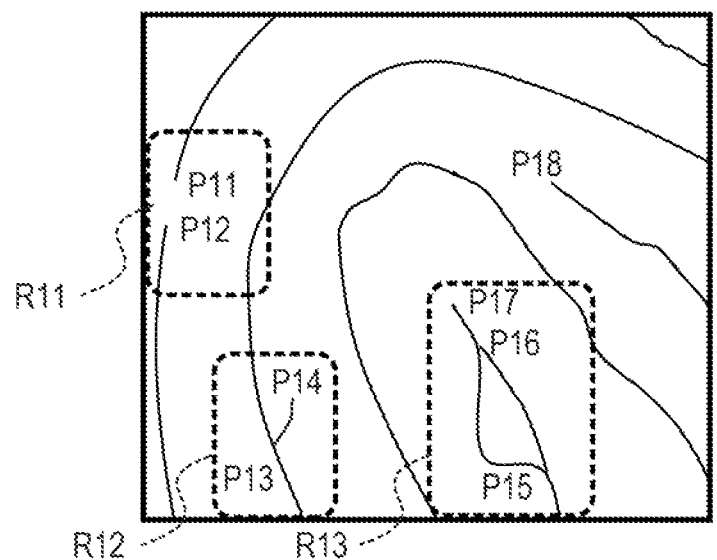
FIG. 5A is an enlarged view illustrating an example of a rolled print image according to the first example embodiment.

FIG. 5A is an enlarged view illustrating an example of a rolled print image according to the present example embodiment. In the region R11 of FIG. 5A, two end points P11 and P12 are extracted for a core line. Further, in the region R12, a branch point P13 and an end point P14 are extracted for a core line. Further, in the region R13, three first feature points of a branch point P15, a branch point (merge point) P16, and an end point P17 are extracted for a core line.

Figure 5B:
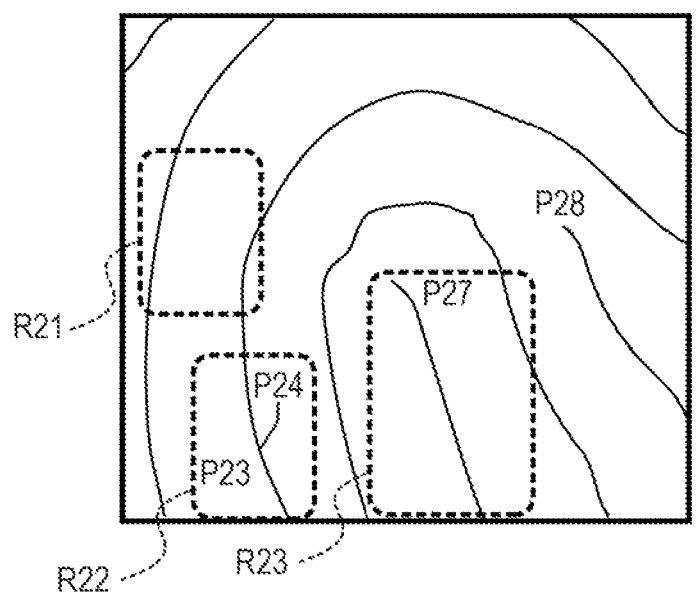
FIG. 5B is an enlarged view illustrating an example of a slap print image according to the first example embodiment.

FIG. 5B is an enlarged view illustrating an example of a slap print image according to the present example embodiment. FIG. 5B illustrates a slap print for a common region of the same finger as that in FIG. 5A. The region R21 of FIG. 5B corresponds to the region R11 of FIG. 5A. In the region R21, however, no second feature point is extracted unlike the region R11.

Further, the region R22 corresponds to the region R12 of FIG. 5A. In the region R22, a branch point P23 and an end point P24 are extracted as the second feature points in the same manner as in the region R12. That is, the branch point P13 (first feature point) and the branch point P23 (second feature point) have a correspondence. Similarly, the end point P14 (first feature point) and the end point P24 (second feature point) have a correspondence.

Further, the region R23 corresponds to the region R13 of FIG. 5A. In the region R23, only the end point P27 is extracted for a core line unlike the region R13. That is, the end point P17 (first feature point) and the end point P27 (second feature point) have a correspondence. However, the second feature point having a correspondence with the first feature point of the branch point P15 or the merge point P16 of FIG. 5A is not present in the region R23. Furthermore, an end point P18 (first feature point) and an end point P28 (second feature point) have a correspondence.

In such a way, out of the first feature points included in a rolled print, a feature point having no correspondence with the second feature points in the slap print may be a target of correction work performed by the user. For example, in the example of FIG. 5A, the user may supplement a core line connecting the end point P11 and the end point P12 to each other to delete the end point P11 and the end point P12 based on the slap print as a reference.

In step S105, the extraction unit 102 acquires pair information on the first feature point and the second feature point and a shift amount thereof. Herein, the pair information is information indicating that the first feature point and the second feature point have a correspondence. The shift amount is an amount of displacement between the first feature point and the second feature point having a correspondence with each other and is used when fingerprinted regions of a rolled print and a slap print are superimposed on each other based on a position in the image of the first feature point and the second feature point as a reference.

In step S106, the extraction unit 102 determines a common region and a non-common region in two types of stamped fingerprints. The common region is a fingerprinted region that is common to a rolled print image and a slap print image. The non-common region is a fingerprinted region excluding the common region out of a fingerprinted region included in a rolled print image.

In step S107, the extraction unit 102 determines the number of unit blocks of an editing target region in the common region and the non-common region.

In step S108, the extraction unit 102 classifies the first feature points in the rolled print image into three patterns based on a region in which the first feature points are present and on the pair information.

In the present example embodiment, the extraction unit 102 classifies the first feature points as follows.
  (A) The first feature point which is present inside the common region, which is common to a slap print, and has a correspondence with the second feature point (hereafter, referred to as "pairing feature point").
  (B) The first feature point which is present inside the common region, which is common to a slap print, and has no correspondence with the second feature point (hereafter, referred to as "non-pairing feature point").
  (C) The first feature point which is present inside the non-common region.

Figure 6:
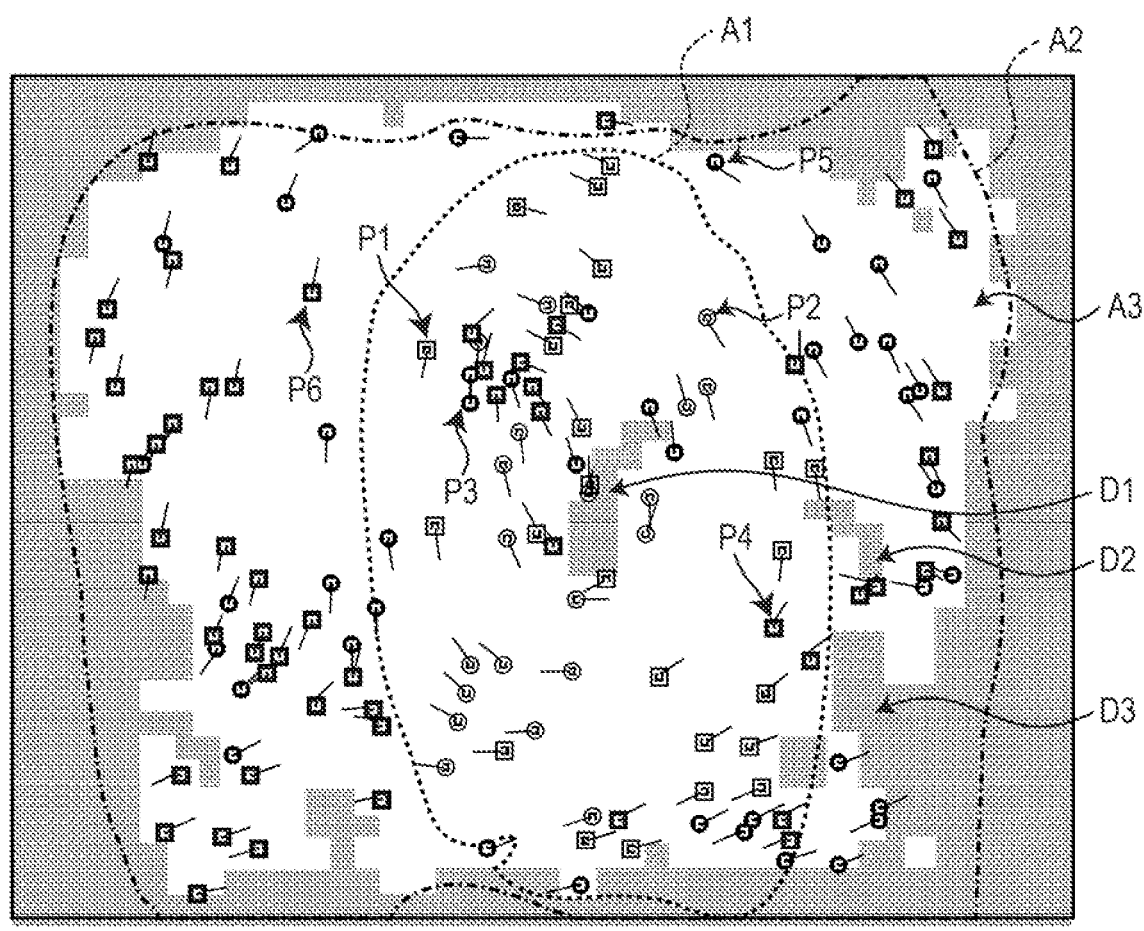
FIG. 6 is a diagram illustrating an example of feature points extracted from a rolled print image and a slap print image.

FIG. 6 is a diagram illustrating an example of feature points extracted from a rolled print image and a slap print image. Herein, the region A1 surrounded by a dashed line is a fingerprinted region of a slap print. The region A2 surrounded by a dot and dash line is a fingerprinted region of a rolled print. The region A1 is also a common region that is common to the rolled print and the slap print. Further, the region A3 excluding the common region (region A1) from the region A2 is a non-common region. Further, the regions D1, D2, and D3 are unidentified zones in which no first feature point is extracted, that is, editing target regions.

Circular marks in FIG. 6 each represent a first feature point which is an end point of a core line. Further, rectangular marks each represent a first feature point which is a branch point of a core line. The direction of a line protruding like a whisker from each of the first feature points represents the direction of a core line. Furthermore, each first feature point represented by a while circular mark or rectangular mark represents a pairing feature point having a correspondence with a second feature point of a slap print. Each first feature point represented by a black circular mark or rectangular mark represents a non-pairing feature point having no correspondence with a second feature point of the slap print. For example, the feature points P1, P2 are pairing feature points. The feature points P3, P4, P5, P6 are non-pairing feature points.

In step S109, the work amount estimation unit 103 calculates an estimated work amount on a finger basis based on the following calculation equation (1), for example.

$$W=(B+C \cdot B/(A+B)) \cdot a + x \cdot b \quad (1)$$

Herein, the symbol W denotes an estimated work amount. The symbol A denotes the total number of pairing feature points present inside a common region. The symbol B denotes the total number of non-pairing feature points present inside the common region. The symbol C is the total number of first feature points present inside a non-common region. The symbol x denotes the total number of editing target regions in which no first feature point is extracted in the common region and the non-common region (that is, the overall fingerprinted region of a rolled print). The total number of editing target zones is counted with an image region of a predetermined size being defined as one block. The symbols a and b each denote a constant and may be set to a desired value.

In the first term of calculation equation (1), the value of $B/(A+B)$ represents a ratio occupied by first feature points (non-pairing feature points) having no correspondence with second feature points out of the first feature points included in the common region that is common to the rolled print and the slap print. When the number of pairing instances between the first feature points and the second feature points is large, this means that the detection accuracy on the first feature points is high. In contrast, when the number of non-pairing instances between the first feature points and the second feature points is large, this means that the detection accuracy on the first feature points is low.

In other words, a multiplication value of the ratio described above and the total number of first feature points present inside a non-common region means that detection accuracy on the first feature points in the non-common region is estimated based on the quality of a rolled print in a common region. Therefore, when the number of non-pairing instances is larger, the multiplication value will be larger. That is, since the detection accuracy on the first feature points is low, the work amount of correction work in the non-common region increases. In contrast, when the number of pairing instances is larger, the multiplication value will be smaller. That is, since the detection accuracy on the first feature points is high, the work amount of correction work in the non-common region decreases.

In step S110, the work amount estimation unit 103 determines whether or not calculation on all the fingers is completed. Herein, if the work amount estimation unit 103 determines that the calculation on all the fingers is completed (step S110: YES), the process proceeds to step S111.

In contrast, if the work amount estimation unit 103 determines that the calculation on all the fingers is not completed (step S110: NO), the process returns to step S102.

In step S111, the work amount estimation unit 103 calculates an estimated work amount on a card basis. For example, the work amount estimation unit 103 calculates a mean value of estimated work amounts for 10 fingers calculated on a finger basis for the common region and the non-common region as an estimated work amount on a card basis (overall work amount) based on calculation equation (1) described above.

Accordingly, the user is able to identify a work amount required for correction work not only on a finger basis but also on a ten-print card basis. Note that the work amount estimation unit 103 may use an integrated value instead of a mean value to calculate an estimated work amount.

In step S112, the data processing unit 107 registers the estimated work amount to a database (for example, the storage unit 108) and ends the process. Note that the data processing unit 107 may normalize the estimated work amount and then register the normalized estimated work amount to the database.

As discussed above, according to the first term of calculation equation (1), the detection accuracy on the first feature points in a non-common region can be estimated based on quality of a rolled print in a common region. As a result, it is possible to easily estimate a work amount in a non-common region that occupies the major part of the whole work amount.

Further, according to the first term of calculation equation (1), the work amount estimation unit 103 estimates a work amount based on the total number of first feature points (the number of non-pairing instances) having no correspondence with second feature points in a common region. The first feature points having no correspondence with second feature points may be a target of correction work. The work amount estimation unit 103 can calculate a more accurate estimated work amount by considering the number of non-pairing instances in addition.

Further, the second term of calculation equation (1) is a part that estimates a work amount in correction work performed by the user on an editing target region. When the number of blocks in the editing target region becomes larger, the work amount of correction work increases. In contrast, when the number of blocks in the editing target region becomes smaller, the work amount of correction work decreases.

As discussed above, according to the first term of calculation equation (1), it is possible to easily estimate a work amount in a common region and a non-common region in accordance with the size of the editing target region.

Note that which of the first term or the second term of calculation equation (1) to attach more weight can be adjusted by suitably changing the values of the constant a and the constant b. The values of the constant a and the constant b may be automatically updated by collecting record data with respect to an estimated work amount and performing statistics analysis thereon.

[Search Process]

Figure 7:
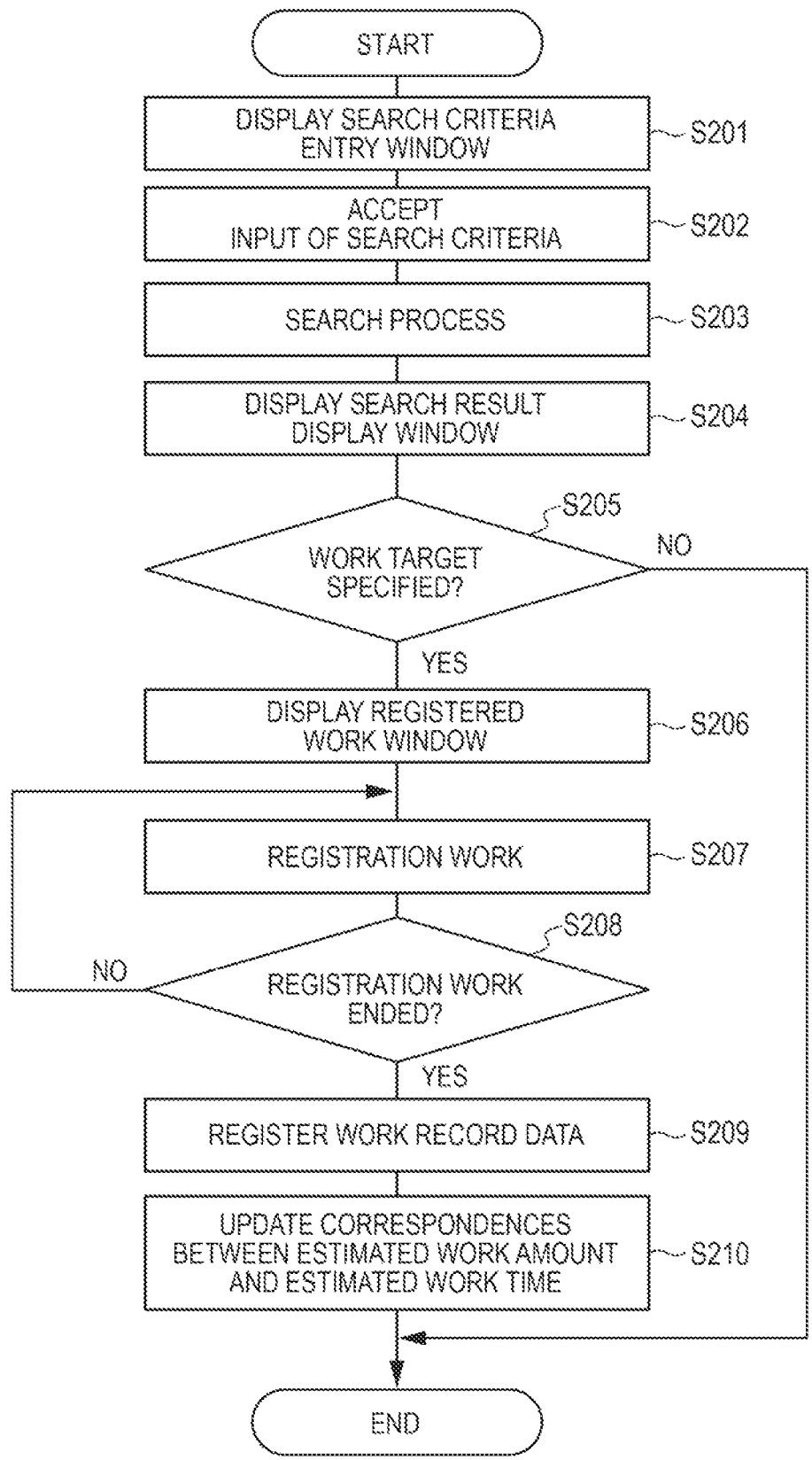
FIG. 7 is a flowchart illustrating an overview of a search process performed in the fingerprint registration device according to the first example embodiment.

FIG. 7 is a flowchart illustrating an overview of a search process performed in the fingerprint registration device 10 according to the present example embodiment. This process is performed when the user performing fingerprint registration work selects a ten-print card of a work target, for example.

In step S201, the display control unit 104 displays a search criteria entry window on the display device 156. This enables the user to reference the search criteria entry window and use the input device 157 to input search criteria.

In step S202, the input accepting unit 105 accepts user input of the search criteria. It is preferable that, for example, a period, a user ID, a range of an estimated work amount, whether or not a card has been registered, or the like can be input as search criteria.

In step S203, the search unit 106 performs a search process and then outputs the search result to the display control unit 104.

In step S204, the display control unit 104 displays a search result display window created based on the search result on the display device 156.

FIG. 8A is a diagram illustrating an example of the search result display window according to the present example embodiment. In FIG. 8A, the search criteria specified by the user are displayed in the upper field in the window. Herein, as the search criteria, a date of creation of a ten-print card ("Nov. 1, 2020 to Nov. 30, 2020"), a range of values of an estimated work amount ("40 or greater"), and the DB registration status ("Unspecified") are described.

Further, a result of search performed based on the search criteria is displayed by using a list in the lower field in the window. The list has data items of a card ID, an estimated work amount, an estimated work time, an actual work time, DB registration status, and a registrant ID. The DB registration status indicates whether or not a ten-print card image has been registered.

For example, for a card having a card ID of "100205", it is indicated that the DB registration status is "Registered", the registrant ID of the registered user is "user101", the estimated work amount is "45", the estimated work time is "T1", and the actual work time is "T10". Since registration is completed for this card, the checkbox is displayed in a non-selectable state.

On the other hand, for a card having a card ID of "100206", it is indicated that the DB registration status is "Unregistered", the estimated work amount is "52", and the estimated work time is "T2". Since registration is not completed for this card, the checkbox is displayed in a selectable state.

Further, in FIG. 8A, it is indicated that the estimated work amount is normalized in a numerical range of 0 to 100. By displaying estimated work amounts using normalized index values, it is possible for the user to select a card while comparing and considering the index values.

Furthermore, in FIG. 8A, estimated work times converted based on a predetermined conversion table from estimated work amounts are displayed in addition to the estimated work amounts. This enables the user to intuitively identify the work times and thus facilitates the user to select a card.

Note that the data items of the search result display window illustrated in FIG. 8A represent a mere example. For example, data items may be displayed as with FIG. 8B to FIG. 8D. The search result illustrated in FIG. 8B corresponds to a search result excluding two columns of data items of the estimated work time and the actual work time from FIG. 8A. Similarly, the search result illustrated in FIG. 8C corresponds to a search result excluding two columns of data items of the estimated work amount and the actual work time from FIG. 8A. The search result illustrated in FIG. 8D corresponds to a search result excluding one column of data items of the actual work time from FIG. 8A.

In step S205, the input accepting unit 105 determines whether or not a work target has been specified in the search result display window via a user operation. Herein, if the input accepting unit 105 determines that the work target has been specified (step S205: YES), the process proceeds to step S206.

In contrast, if the input accepting unit 105 determines that the work target has not been specified (step S205: NO), the process ends.

In step S206, the display control unit 104 displays a registration work window related to the specified ten-print card image.

In step S207, the user corrects one or more feature points or core lines in the rolled print image based on the slap print image of the same finger and performs registration work.

In step S208, the input accepting unit 105 determines whether or not the user has ended the registration work. Herein, if the input accepting unit 105 determines that the user has ended the registration work (step S208: YES), the process proceeds to step S209.

In contrast, if the input accepting unit 105 determines that the user has not ended the registration work (step S208: NO), the process returns to step S207.

In step S209, the data processing unit 107 registers the fingerprint image corrected by the user and the work record data to the storage unit 108.

In step S210, the data processing unit 107 updates the correspondence between the estimated work amount and the estimated work time registered in the storage unit 108 based on the work record data and ends the process.

As set forth, according to the fingerprint registration device 10 of the present example embodiment, based on a result of matching between first feature points of a rolled print and second feature points of a slap print extracted from a ten-print card image input to the device, it is possible to estimate a work amount of correction work performed by a user before registration of the ten-print card image and present the estimated work amount to the user. Accordingly, when manually correcting a ten-print card image, the user is able to identify a work amount before starting the work. That is, according to the present example embodiment, the fingerprint registration device 10 that supports correction and registration work on a ten-print card image performed by the user is provided.

According to the fingerprint registration device of the present example embodiment, when the user completes correction work, the correspondence between an estimated work amount and an estimated work time can be sequentially updated based on the actual work time (record data) of the correction work. Accumulation of record data makes it possible to convert an estimated work amount into a time at high accuracy.

The fingerprint registration device 10 described in the above example embodiment can also be configured as with the following second to sixth example embodiments. Note that a reference common to the reference applied in the drawings of the first example embodiment denotes the same object. Description of features common to the first example embodiment will be omitted, and different features will be described in detail.

Second Example Embodiment

The fingerprint registration device 10 according to the first example embodiment described above has a configuration to display information consistent with search criteria when the user specifies the search criteria on a screen. In contrast, the fingerprint registration device 10 according to the present example embodiment differs from the first example embodiment in that neither specifying of search criteria by the user nor a search process is required.

Specifically, when registration work related to a ten-print card image is requested from the user, the fingerprint registration device 10 according to the present example embodiment acquires information on unregistered ten-print cards used for fingerprint matching from a database such as the storage unit 108 and displays the information in a list.

FIG. 9 is a diagram illustrating an example of an estimated work information list window according to the present example embodiment. Herein, only the card ID that identifies a ten-print card image and the estimated work information on a card basis are displayed as minimum required data items for the user to select a ten-print card of a work target. The estimated work information may be an estimated work amount normalized into values of 0 to 100 or may be an estimated work time corresponding to an estimated work amount in the same manner as the first example embodiment.

According to the fingerprint registration device 10 of the present example embodiment, since the user does not have to specify search criteria, the user is able to identify a ten-print card which may be a work target and the estimated work information by involving fewer operations than in the case of the first example embodiment.

Third Example Embodiment

The fingerprint registration device 10 according to the first example embodiment described above has a configuration to average estimated work amounts calculated on a finger basis and display the average as the overall work amount for 10 fingers. In contrast, the fingerprint registration device 10 according to the present example embodiment differs from the first example embodiment in that estimated work amounts calculated on a finger basis are displayed on a screen.

FIG. 10 is a diagram illustrating an example of an estimated work amount list window according to the present example embodiment. Herein, estimated work amounts calculated for each finger of both hands are displayed for each card ID of ten-print cards.

For example, for a ten-print card having a card ID of "100101", the estimated work amounts on the little finger, the ring finger, the middle finger, the index finger, and the thumb of the left hand are "3", "4", "2", "6", "7", respectively. That is, in the left hand, the estimated work amount on the thumb has the largest value, and the estimated work amount on the middle finger has the smallest value.

Further, the estimated work amounts on the thumb, the index finger, the middle finger, the ring finger, and the little finger of the right hand are "10", "1", "3", "2", "4", respectively. That is, in the right hand, the estimated work amount on the thumb has the largest value, and the estimated work amount on the index finger has the smallest value.

Note that data items of mean values of estimated work amounts on a finger basis or integrated values of estimated work amounts on a finger basis may be included in a list and displayed as the overall work amount in the same manner as the first example embodiment.

According to the fingerprint registration device of the present example embodiment, since the user is able to identify estimated work amounts calculated on a finger basis, it is possible to more easily select a card used as a work target out of a large number of ten-print cards.

Fourth Example Embodiment

The fingerprint registration device 10 according to the present example embodiment differs from the first example embodiment in that fields of rolled prints included in a ten-print card image are displayed in different colors so as to correspond to ranges of estimated work amounts calculated on a finger basis.

Figure 11:
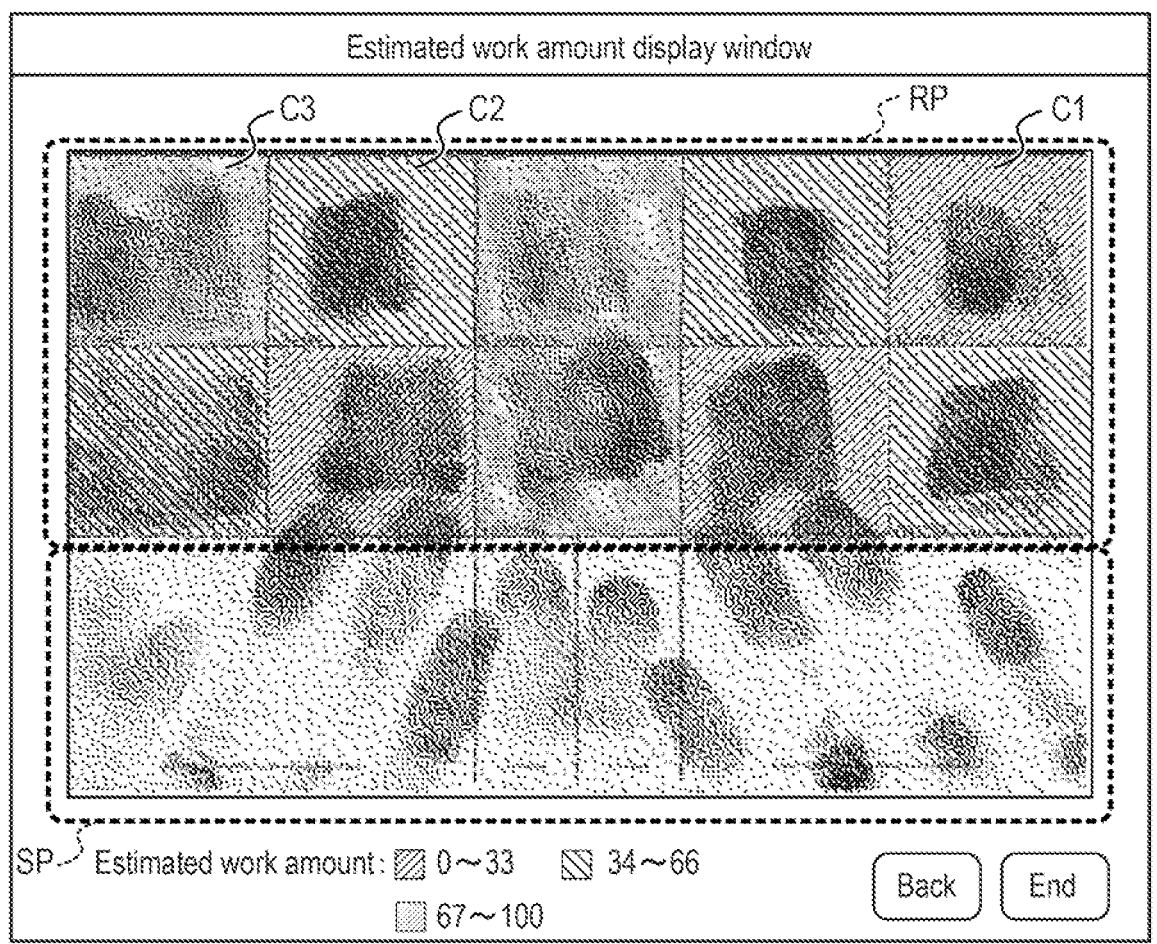
FIG. 11 is a diagram illustrating an example of an estimated work amount display window according to a fourth example embodiment.

FIG. 11 is a diagram illustrating an example of an estimated work amount display window according to the present example embodiment. Herein, it is indicated that a range of estimated work amounts calculated on a finger basis is classified into three classes C1, C2, C3. The class C1 indicates that the estimated work amount is 0 to 33. The class C2 indicates that the estimated work amount is 34 to 66. The class C3 indicates that the estimated work amount is 67 to 100. For example, the display colors of the classes C1, C2, C3 may be set to blue, yellow, red, respectively. However, any type of display colors and any number of display colors may be set.

According to the fingerprint registration device of the present example embodiment, the user is able to intuitively identify estimated work amounts calculated on a finger basis by display colors.

Fifth Example Embodiment

The fingerprint registration device 10 according to the present example embodiment differs from the first example embodiment in that estimated work amounts calculated on a finger basis are superimposed on and displayed inside the fields of rolled prints included in a ten-print card image.

Figure 12:
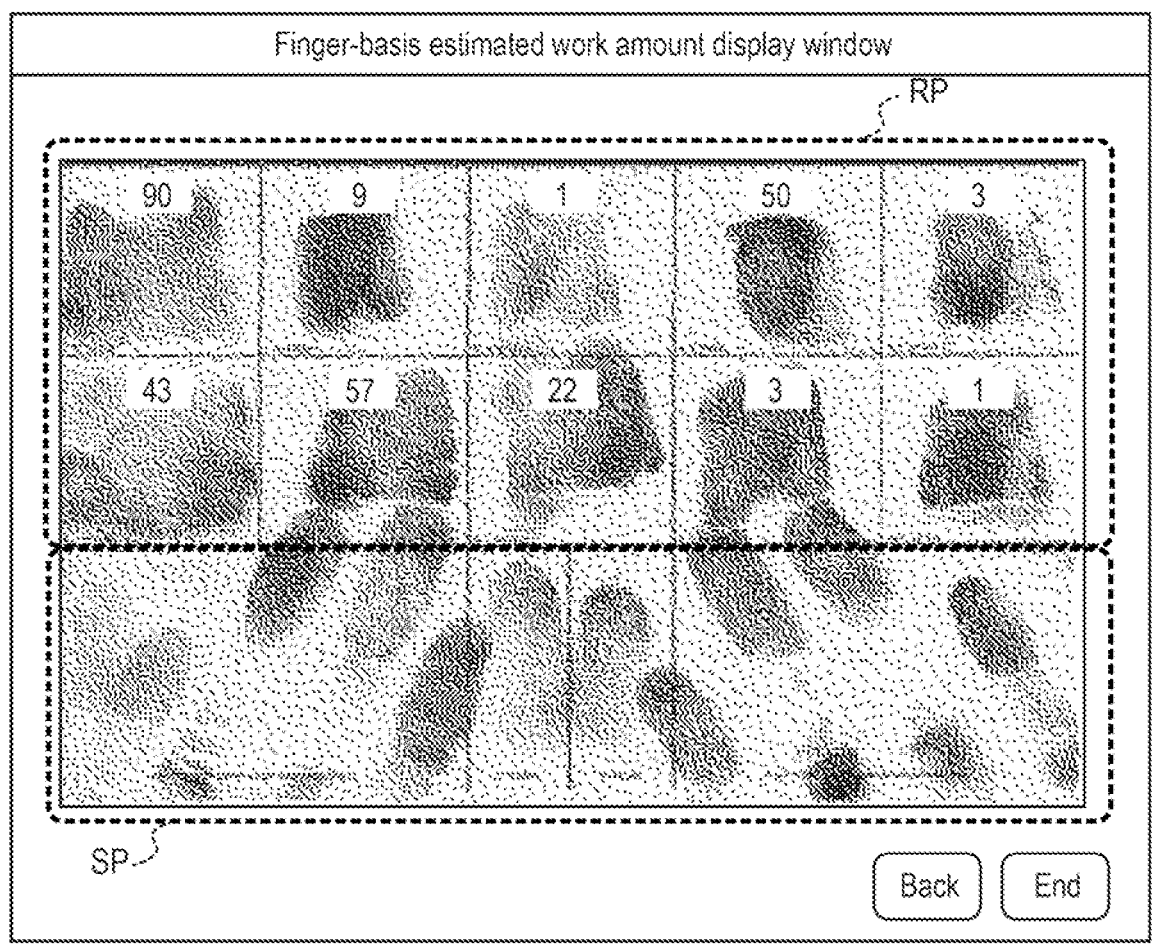
FIG. 12 is a diagram illustrating an example of a finger-basis estimated work amount display window according to a fifth example embodiment.

FIG. 12 is a diagram illustrating an example of an estimated work amount display window according to the present example embodiment. Herein, it is indicated that estimated work amounts calculated on a finger basis are superimposed on and displayed inside the fields of rolled prints for 10 fingers, respectively.

According to the fingerprint registration device 10 of the present example embodiment, the user is able to identify values of estimated work amounts calculated on a finger basis together with rolled print images. This enables the user to easily determine that the work amount of which finger is larger or smaller.

Sixth Example Embodiment

Figure 13:
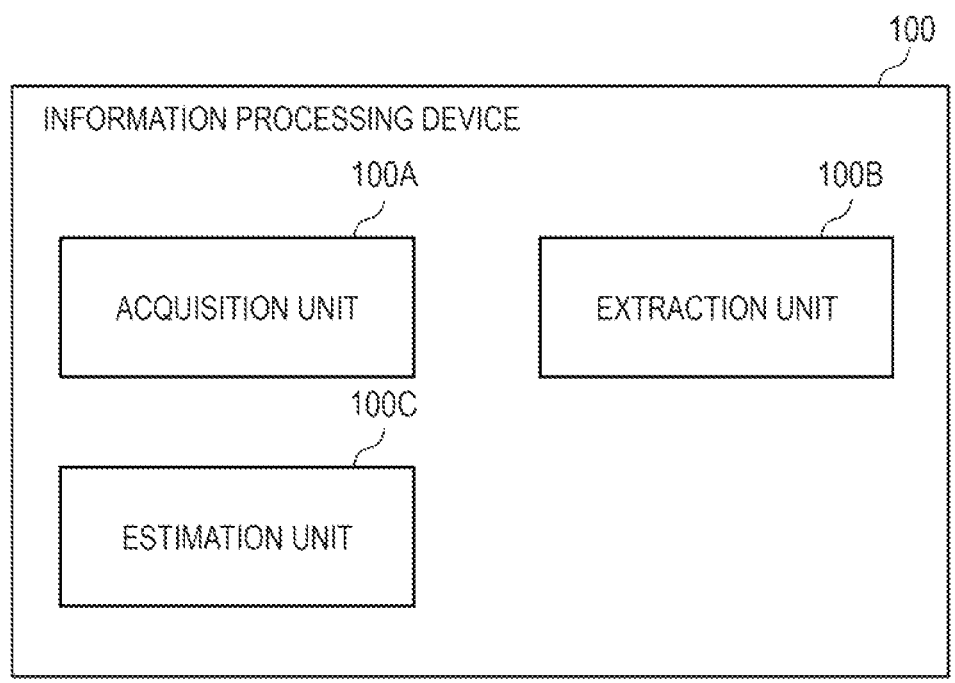
FIG. 13 is a function block diagram of an information processing device according to a sixth example embodiment.

FIG. 13 is a function block diagram of an information processing device 100 according to the present example embodiment. The information processing device 100 includes an acquisition unit 100A, an extraction unit 100B, and an estimation unit 100C. The acquisition unit 100A acquires a rolled print and a slap print on the same finger. The extraction unit 100B extracts first feature points from the rolled print and second feature points from the slap print, respectively. Based on a ratio occupied by first feature points having no correspondence with the second feature points out of the first feature points included in a common region that is common to the rolled print and the slap print, the estimation unit 100C estimates a first work amount of correction work performed by a user on a non-common region excluding the common region from the rolled print.

According to the present example embodiment, the information processing device 100 that enables the user to easily identify a work amount at fingerprint registration work is provided.

Modified Example Embodiment

The disclosure is not limited to the example embodiments described above and can be changed as appropriate within a scope not departing from the spirit of the disclosure.

The scope of each example embodiment also includes a processing method of storing, in a storage medium, a program that causes the configuration of the example embodiments described above to operate so as to implement the function of these example embodiments, reading the program stored in the storage medium as a code, and executing the program at a computer. That is, a computer readable storage medium is also included in the scope of each example embodiment. Further, not only the storage medium storing the program described above but also the program itself is included in each example embodiment. Further, one or two or more components included in the example embodiments described above may be a circuit such as an ASIC, an FPGA, or the like configured to implement the function of each component.

As the storage medium, for example, a floppy (registered trademark) disk, a hard disk, an optical disk, a magneto-optical disk, a compact disk (CD)-ROM, a magnetic tape, a nonvolatile memory card, or a ROM can be used. Further, the scope of each example embodiment includes not only those performing a process by using a program stored in the storage medium alone but also those cooperating with the function of other software or an extension board and operating on operating system (OS) to perform the process.

The service implemented by the function of each example embodiment described above can also be provided to the user in a form of Software as a Service (SaaS).

The whole or part of the example embodiments disclosed above can be described as, but not limited to, the following supplementary notes.

(Supplementary Note 1)

An information processing device comprising: an acquisition unit that acquires a rolled print and a slap print on the same finger;

an extraction unit that extracts first feature points from the rolled print and second feature points from the slap print, respectively; and an estimation unit that, based on a ratio occupied by the first feature points having no correspondence with the second feature points out of the first feature points included in a common region that is common to the rolled print and the slap print, estimates a first work amount of correction work performed by a user on a non-common region excluding the common region from the rolled print.

(Supplementary Note 2)

The information processing device according to supplementary note 1, wherein based on the size of a region from which the first feature points are not extracted in the rolled print, the estimation unit estimates a second work amount of correction work on the region when the rolled print and the slap print are superimposed on each other based on positions of the first feature points and the second feature points as references.

(Supplementary Note 3)

The information processing device according to supplementary note 2, wherein the estimation unit estimates a third work amount of correction work on the common region based on the total number of first feature points having no correspondence with the second feature points in the common region.

(Supplementary Note 4)

The information processing device according to supplementary note 3, wherein the acquisition unit acquires the rolled print and the slap print from a fingerprint image group for 10 fingers of the same person, and wherein the estimation unit estimates an overall work amount in correction work on the 10 fingers based on the first work amount, the second work amount, and the third work amount calculated for each finger.

(Supplementary Note 5)

The information processing device according to any one of supplementary notes 1 to 3, wherein the estimation unit estimates the first work amount based on a multiplication value of the total number of the first feature points included in the non-common region and the ratio.

(Supplementary Note 6)

The information processing device according to supplementary note 4 further comprising:

a display control unit that displays an index value on a screen, the index value being normalized from the overall work amount.

(Supplementary Note 7)

The information processing device according to supplementary note 4 further comprising:

a display control unit that displays an estimated work time on a screen, the estimated work time corresponding to the overall work amount.

(Supplementary Note 8)

The information processing device according to supplementary note 7 further comprising:

a processing unit that updates the estimated work time based on record data on the correction work corresponding to the overall work amount.

(Supplementary Note 9)

An information processing method comprising: acquiring a rolled print and a slap print on the same finger;

extracting first feature points from the rolled print and second feature points from the slap print, respectively; and based on a ratio occupied by the first feature points having no correspondence with the second feature points out of the first feature points included in a common region that is common to the rolled print and the slap print, estimating a first work amount of correction work performed by a user on a non-common region excluding the common region from the rolled print.

(Supplementary Note 10)

A storage medium storing a program that causes a computer to perform:

acquiring a rolled print and a slap print on the same finger;

extracting first feature points from the rolled print and second feature points from the slap print, respectively; and based on a ratio occupied by the first feature points having no correspondence with the second feature points out of the first feature points included in a common region that is common to the rolled print and the slap print, estimating a first work amount of correction work performed by a user on a non-common region excluding the common region from the rolled print.

This application is based upon and claims the benefit of priority from Japanese Patent Application No. 2020-206529, filed on Dec. 14, 2020, the disclosure of which is incorporated herein in its entirety by reference.

REFERENCE SIGNS LIST 10 fingerprint registration device
100 information processing device
101 fingerprint image acquisition unit
102 extraction unit
103 work amount estimation unit
104 display control unit 105 input accepting unit
106 search unit
107 data processing unit
108 storage unit
151 processor
152 RAM
153 ROM
154 storage
155 communication I/F
156 display device
157 input device

What is claimed is:

1. An information processing device comprising:
at least one memory that is configured to store instructions; and
at least one processor that is configured to execute the instructions to;
acquire a rolled print and a slap print on the same finger;
extract first feature points from the rolled print and second feature points from the slap print, respectively; and
based on a ratio occupied by the first feature points having no correspondence with the second feature points out of the first feature points included in a common region that is common to the rolled print and the slap print, estimate a first work amount of correction work performed by a user on a non-common region excluding the common region from the rolled print.

2. The information processing device according to claim 1, wherein said at least one processor is further configured to:
based on the size of a region from which the first feature points are not extracted in the rolled print, estimate a second work amount of correction work on the region when the rolled print and the slap print are superimposed on each other based on positions of the first feature points and the second feature points as references.

3. The information processing device according to claim 2, wherein said at least one processor is further configured to:
estimate a third work amount of correction work on the common region based on the total number of first feature points having no correspondence with the second feature points in the common region.

4. The information processing device according to claim 3, said at least one processor is further configured to:
acquire the rolled print and the slap print from a fingerprint image group for 10 fingers of the same person; and
estimate an overall work amount in correction work on the 10 fingers based on the first work amount, the second work amount, and the third work amount calculated for each finger.

5. The information processing device according to claim 4 wherein said at least one processor is further configured to:
display an index value on a screen, the index value being normalized from the overall work amount.

6. The information processing device according to claim 4 wherein said at least one processor is further configured to:
display an estimated work time on a screen, the estimated work time corresponding to the overall work amount.

7. The information processing device according to claim 6 wherein said at least one processor is further configured to:
update the estimated work time based on record data on the correction work corresponding to the overall work amount.

8. The information processing device according to claim 1, wherein said at least one processor is further configured to:
estimate the first work amount based on a multiplication value of the total number of the first feature points included in the non- common region and the ratio.

9. An information processing method comprising:
acquiring a rolled print and a slap print on the same finger;
extracting first feature points from the rolled print and second feature points from the slap print, respectively; and
based on a ratio occupied by the first feature points having no correspondence with the second feature points out of the first feature points included in a common region that is common to the rolled print and the slap print, estimating a first work amount of correction work performed by a user on a non-common region excluding the common region from the rolled print.

10. A non-transitory storage medium storing a program that causes a computer to perform:
acquiring a rolled print and a slap print on the same finger;
extracting first feature points from the rolled print and second feature points from the slap print, respectively; and
based on a ratio occupied by the first feature points having no correspondence with the second feature points out of the first feature points included in a common region that is common to the rolled print and the slap print, estimating a first work amount of correction work performed by a user on a non-common region excluding the common region from the rolled print.

* * * * *